United States Patent [15] 3,678,299

Diener [45] July 18, 1972

[54] TRANSISTOR CIRCUIT ARRANGEMENT FOR SUPPLYING A LOAD WITH WORK PULSES OF CONSTANT CURRENT INTENSITY

[72] Inventor: Rudolf Diener, Zurich, Switzerland

[73] Assignee: Autoelektronik AG, Chur, Graubunden, Switzerland

[22] Filed: Nov. 17, 1970

[21] Appl. No.: 90,299

[30] Foreign Application Priority Data

Oct. 13, 1970 Switzerland ........................15140/70
Nov. 20, 1969 Switzerland ........................17307/69

[52] U.S. Cl. ........................307/275, 307/252 N, 307/310, 331/112, 331/146, 123/148

[51] Int. Cl. ........................H03k 17/00, H03k 3/30

[58] Field of Search ...............307/275, 252.21, 252.70, 310; 331/112, 146; 123/148

[56] References Cited

UNITED STATES PATENTS

| | | | |
|---|---|---|---|
| 3,395,686 | 8/1968 | Minks | 307/275 |
| 3,479,531 | 11/1969 | Gauld | 307/275 |
| 3,313,954 | 4/1967 | Walker | 307/275 |
| 3,344,287 | 9/1967 | Eriksson | 307/275 |

*Primary Examiner*—Rudolph V. Rolinec
*Assistant Examiner*—David M. Carter
*Attorney*—Ostrolenk, Faber, Gerb & Soffen

[57] ABSTRACT

A transistor circuit arrangement for supplying a load with work pulses of constant current intensity, comprising a load, a switching transistor having a collector-emitter path and a main winding of a feedback element connected in series with a direct-current voltage source. A control pulse generator for each work pulse gates the switching transistor via a control winding of the feedback element coupled with the base of the switching transistor, and means serve to block the switching transistor each time when a current flowing through said series circuit has risen to a certain current intensity. More specifically, there is provided a control thyristor coupled with the base current circuit of the switching transistor and an ignition circuit for the control thyristor which contains a passive semiconductor component as a temperature-dependent resistor. The control thyristor is turned-on each time by the collector current of the transistor, the intensity of which is determined by the resistance value of the ignition circuit, and the switching transistor is completely blocked by the feedback element.

22 Claims, 1 Drawing Figure

PATENTED JUL 18 1972 3,678,299
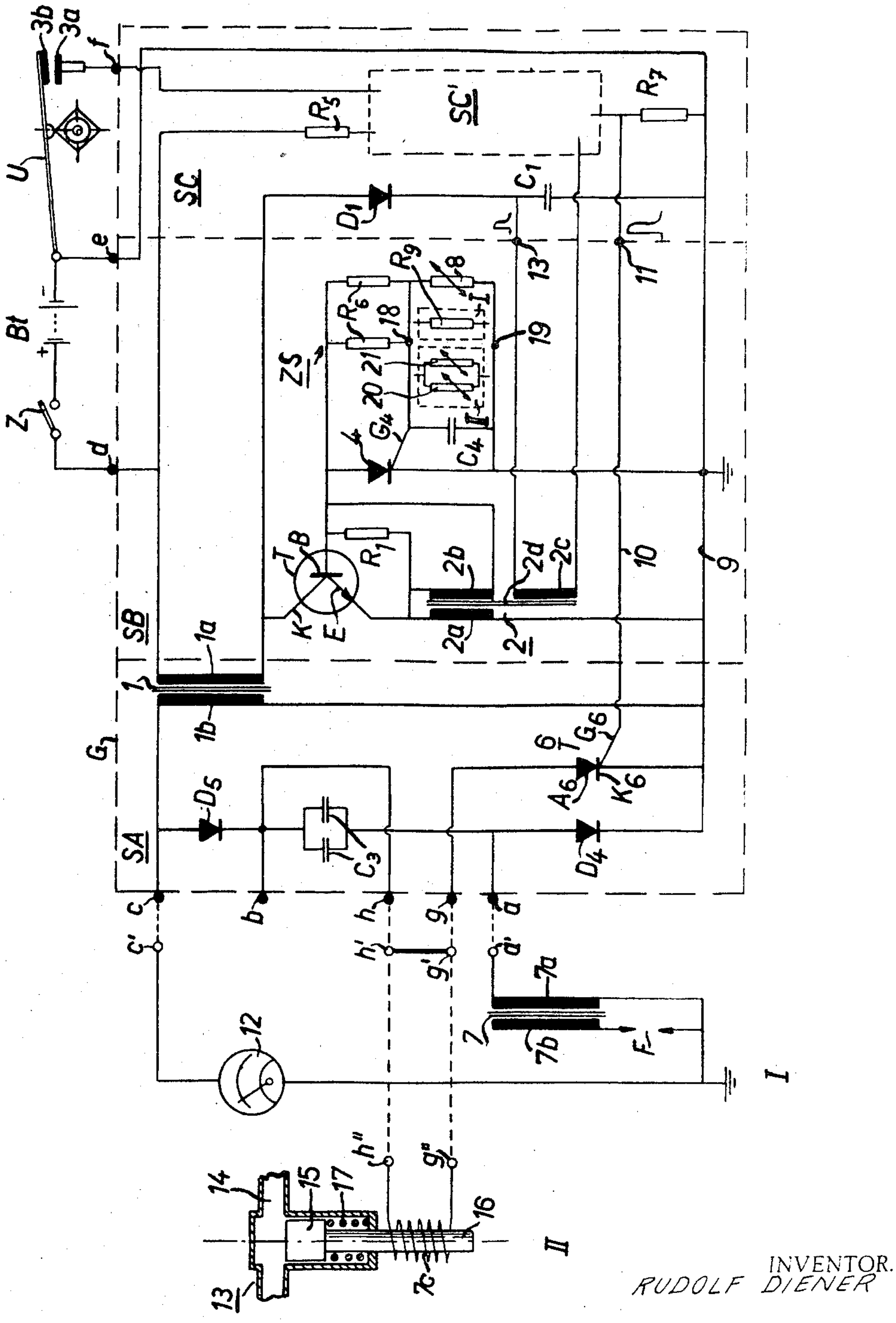
INVENTOR.
RUDOLF DIENER
BY
Ostrolenk, Faber, Gerb & Soffen
ATTORNEYS

TRANSISTOR CIRCUIT ARRANGEMENT FOR SUPPLYING A LOAD WITH WORK PULSES OF CONSTANT CURRENT INTENSITY

BACKGROUND OF THE INVENTION

The present invention relates to a new and improved transistor circuit arrangement for supplying a load with work pulses of constant current intensity. The circuit arrangement of the invention is of the type wherein the load, the collector-emitter path of a switching transistor and the main winding of a feedback element are connected in series with a direct-current supply source, a control pulse generator firing the switching transistor for each work pulse through the agency of a control winding of the feedback element coupled with the base of the switching transistor, and furthermore, switching elements being provided in order to block the switching transistor each time when the current flowing through the series circuit has reached a predetermined intensity.

Such transistor circuit arrangements are used, for instance, in the capacitor-ignition devices for internal combustion engines equipped with interrupter means, since the voltage of the direct-current source, the supply battery of the vehicle, is subjected to pronounced fluctuations and the ignition sparks must possess a certain energy in order to always ensure for positive ignition.

There is known a capacitor ignition device for an internal combustion engine, for instance, utilizing mechanical interrupter means, wherein with the contacts of the interrupter closed a storage capacitor is charged by means of a charging rectifier through the secondary winding of a charging transformer. Upon opening of the interrupter contacts by means of a thyristor, this capacitor discharges through the primary winding of an ignition transformer. The primary winding of the charging transformer serving as the load is then connected in series with the collector-emitter path of a switching transistor.

The prior art is familiar with different capacitor ignition devices of this type.

Thus, for instance, with a prior art ignition device there is, for instance, provided a transistorized pulse generator circuit for controlling a switching transistor and an ignition thyristor arranged in the discharge circuit of a storage capacitor. The transistorized pulse generator circuit embodies a control transformer possessing two control or secondary windings, one secondary winding being electrically coupled with the base of the switching transistor and the second secondary winding with the control electrode of the ignition thyristor. By means of a control pulse produced across the interrupter, the pulse generator circuit causes a current to flow through the primary or main winding of the control transformer. Consequently, there is induced in the first secondary winding a gating control pulse for the switching transistor and in the second secondary winding an ignition pulse for the ignition thyristor. Upon discharge of the storage capacitor, the resonance of the discharge circuit brings about blocking of the ignition thyristor. For the purpose of blocking the switching transistor, there is additionally connected a resistor in the series circuit of the excitation winding of the inductive storage means and the collector-emitter path of the switching transistor. The entire excitation current flows through this resistor. When the excitation current reaches a certain intensity, the voltage drop across the resistor controls the transistorized pulse generator circuit in such a manner that the current flow through the primary winding of the control transformer is interrupted and a blocking control pulse for the switching transistor is induced in the first secondary winding of such control transformer.

In accordance with another known ignition device, there is provided a feedback element consisting of a switching core which can be magnitized into two saturation states and possessing three windings. Of these three windings, a primary winding and a control winding are arranged in the manner previously explained and the remaining third winding is connected in series with the direct-current source and the interrupter contacts. When the interrupter contacts are closed, the switching core is brought into its negative saturation state by the third winding and upon opening the interrupter contacts a voltage is induced in the control winding. By means of this induced voltage, the switching transistor conducts and current begins to flow through the primary winding of the charging transformer and the main winding of the feedback element. Due to the increased intensity of the current wing to the feedback, the switching core is brought into its positive saturation state via the main winding, so that a voltage is no longer induced in the control winding and the switching transistor blocks. The charging transformer possesses a second secondary winding to control the ignition thyristor arranged in the discharge circuit of the storage capacitor. An ignition pulse for the ignition thyristor is induced in this second secondary winding upon excitation of the primary winding of the charging transformer.

Generally, the current intensity in the discharge circuit of the storage capacitor amounts to about 120 amperes and the current flowing through the primary winding of the charging transformer has an intensity of approximately 10 amperes. The discharge current is switched by means of the ignition thyristor and the current in the primary winding by means of the switching transistor.

The voltage drop of the controlled collector-emitter path of a commercially available n-p-n-transistor generally amounts to about 0.3 volts, resulting in a power loss of about 3 watts in the primary circuit of the charging transformer. However, in addition to this slight basic power loss there must be considered the individual power losses of the switching elements used for generating the control pulses for the ignition thyristor and the switching transistor, and the total power loss results in a certain inherent heating-up of the ignition device.

Owing to the temperature sensitivity of the semicondcutor circuit components the control circuit becomes unstable at higher temperatures, and therefore, the ignition mechanism or device becomes incapable of properly functioning. Since the ignition system is arranged at the neighborhood of the internal combustion engine and inasmuch as the surrounding temperature amounts to 80° C. and more, transistorized ignition devices are extremely sensitive to inherent or self-heating. The basic power loss of about 3 watts causes a practically negligible self-heating effect, which does not cause any change of the adjusted circuit parameters. In the known capacitor ignition devices, the additional power losses in the control circuit for the ignition thyristor and switching transistor are relatively high, so that the device during operation oftentimes becomes heated-up beyond the permissible temperature limit and disturbances occur.

SUMMARY OF THE INVENTION

Therefore, there is a real need in the art for electronic circuitry of the aforementioned general type and for the previously discussed use which is not associated with the drawbacks present in the state-of-the-art circuit design. Accordingly, a primary object of the present invention is to provide electronic circuitry which effectively and capably fulfills this existing need.

Another, more specific object of the present invention relates to the provision of an improved transistor circuit arrangement for supplying a load with work pulses of constant current intensity, which possesses a relatively simple and economical construction and has such a small total power loss that the self-heating effects brought about thereby are not sufficient for changing the adjusted or regulated circuit parameters.

Now, in order to implement these and still further objects of the invention, which will become more readily apparent as the description proceeds, the inventive transistor circuit arrangement is generally manifested by the features that a control thyristor is arranged at the base current circuit of the switching transistor, and for such control thyristor there is provided an ignition circuit containing a passive semiconductor element as a temperature-dependent resistance. The control thyristor always then switches-on at a certain intensity of the collector current determined by the resistance parameter of the ignition circuit and the switching transistor is completely blocked by means of the feedback element.

In order to switch-off the current flow through the load it is only necessary to briefly reduce the conduction of the collector-emitter path of the switching transistor by means of the control thyristor which has been switched into its conductive state and arranged at the base current circuit of the switching transistor, to such an extent that the collector current reduces. Consequently, in the control winding of the feedback element there is induced a voltage which completely blocks the switching transistor already after a time interval of about 1 microsecond. Due to this arrangement and functionality, it is possible to therefore make use of a slight dimensioned control thyristor whose power losses are extremely small.

Apart from the load current flowing through the switching path of the switching transistor, it only still flows through the main winding of the feedback element. Due to current flow in the main winding there are only induced control voltages in the control winding. Thus, the main winding can consist of relatively thick wire and possess only a few turns, so that also the losses occurring in the feedback element can be maintained low. The circuit arrangement can be therefore dimensioned without difficulty such that its total power loss is essentially determined by the low basic power loss of the controlled switching path of the switching transistor which does not contribute to any additional heating-up of the semiconductor components.

Hence, as far as the functionality or mode of operation of the circuit arrangement is concerned, then only its inherent temperature is of significance, which, however, owing to fluctuations in the ambient temperature can, under circumstances, considerably fluctuate, as such especially is then the case when the circuit arrangement is used in the ignition mechanism or device of trucks or similar type heavy-duty vehicles. The component ensuring the control thyristor. The passive semiconductor element in the ignition circuit of the control thyristor, which provides a temperature-dependent resistance and which preferably can be a thermistor, serves to compensate for the influences of temperature fluctuations.

In the most simple situation the ignition circuit for the control thyristor can contain ohmic resistors connected with its anode and control electrode and/or at its cathode and control electrode. At least one of these resistors can be adjusted to different resistance values for regulating the reference value-current intensity of the work pulses. In order to be able to make use of mass-produced semiconductor elements of the same type but possessing rated values within a certain tolerance range, and further, in order to be able to adjust the circuit arrangement easily to the momentarily desired value of the reference current intensity for the work pulses, there is advantageously provided at the ignition circuit a manually adjustable work resistor. Should the reference value-current intensity of the work pulses be influenced by additional influencing parameters or factors, such as for instance air pressure, light conditions, humidity and so forth, then the ignition circuit for the control thyristor can be additionally adjusted by means of appropriate measurement value transmitter means or can contain adjustable resistors sensitive to these influencing parameters or factors. Then, preferable is preferably to connect in parallel the temperature-dependent resistor and the adjustable resistors and to couple such with the control electrode and the cathode of the control thyristor, whereas the work resistor is connected with the control electrode and the anode of the control thyristor. There is thus obtained for the ignition circuit a voltage divider which is simple to switch nd easy to adjust, and notwithstanding its simple construction affords an exact blocking of the switching transistor via the ignition of the control thyristor. Apart from the exact blocking of the switching transistor, there is necessary for such a circuit arrangement generally also a positive error-free gating or up-sensing of the switching transistor which must be resorted to in each case at a certain predetermined period of time. In order to attain such, there is preferably provided for the generation of the gating control pulses for the switching transistor a control pulse generator containing a control capacitor and a feedback element equipped with a second control winding galvanically separated from a first control winding. This second control winding is coupled with the control capacitor so that during each discharge of the control capacitor through the second control winding, controlled by the control pulse generator, there is induced in the first control winding of the feedback element a gating control pulse for the switching transistor. By means of the discharge of a capacitor there can be generated in known manner and in a simple way brief or short control pulses possessing steep ascending flanks. Hence, by selecting a sufficiently high turn-ratio between the first and second control windings there can be ensured that the switching transistor positively cuts-in also in the presence of weak gating control pulses. In order to reduce the thus required number of turns of the windings such can be arranged upon an iron core, whereby, however, in contrast to other known circuit arrangements of this type, the feedback element is dimensioned such that its iron core is not saturated at the maximum intensity of the current flowing through its main winding, and therefore practically no power losses are present which would additionally heat-up the feedback element.

Owing to its reliability during operation the transistor circuit arrangement designed according to the invention can be used to particular advantage for controlling the combustion of fuel in an internal combustion engine with ignition controlled by a control transmitter. The load then is equipped with a storage capacitor and a charging transformer. During a first position of the control transmitter the storage capacitor is charged via a charging rectifier through the secondary winding of the charging transformer. In a second position of the control transmitter the storage capacitor is discharged by means of an ignition thyristor through a terminal load element. During such use of the equipment the collector-emitter path of the switching transistor is advantageously connected through the primary winding of the charging transformer with the one pole of the direct-current source and by means of the main winding of the feedback element with the other pole of such direct-current source. Moreover, the feedback element as well as the ignition thyristor are coupled with the control pulse generator controlled by the control transmitter, so that there can always then be obtained an ignition pulse for the ignition thyristor and a gating control pulse for the switching transistor when the control transmitter assumes its second position. If the circuit arrangement is used for the controlled generation of ignition sparks, then the terminal load element is an ignition transformer, the primary winding of which is coupled with the storage capacitor. Hence, the capacitance of such capacitor is then a contributing factor for the momentary ignition spark energy during constant voltage at the storage capacitor. The capacitance of a conventional capacitor, however, is dependent upon temperature, so that the maximum current intensity of the work pulses flowing through the primary winding of the charging transformer must be adjusted as a function of the temperature of the storage capacitor, and specifically in such a manner that the storage capacitor can be charged up to correspondingly different voltage values by means of the secondary winding of the charging transformer in order to maintain, for instance, the ignition power constant. With correct adjustment of the resistance values at the ignition circuit of the control thyristor the adjustment of the current intensities occurs automatically by means of the temperature-dependent resistor. In order to ensure positive start-up and quiet running of an internal combustion engine the ignition power, when the engine is cold, must be large and, on the other hand, with increasing temperature, should reduce. Conventional capacitors typically exhibit a positive temperature coefficient for the capacitance, so that in such case there is required so to speak an over-compensation of the course of the energy of the ignition sparks brought about by the temperature sensitivity of the storage capacitor. This overcompensation is also attained by appropriate values for the ohmic work resistor and the temperature-dependent resistor of the ignition circuit of the control thyristor. In fact, such resistance values are provided for these components that throughout a regulation of the current flowing in the primary winding of the charging transformer there is ensured a charging-up of the storage capacitor to 480 volts at −20° C., to 380 volts at +20° C. and to 360 volts at +110° C. In order to simplify the adjustment there can be used as the temperature-dependent resistor a thermistor having a resistance value of 1.5 kohm at +25° C. and connected parallel to such thermistor there is an ohmic resistance of maximum 100 ohms.

Particularly, in the case of the mentioned use of the circuitry especially great requirements are placed upon the transistor circuit arrangement. It has been found that the feedback element, by means of which the switching transistor is controlled, must be dimensioned and designed with considerable care if there is to be prevented operational disturbances. Hence, there is preferably used a feedback element possessing a main or primary winding, a first control winding and a second control winding, wherein the turn ratios for the windings in the previously mentioned sequence are in a relationship of 1:3.5:1.5. In order to obtain small dimensions for the system, there is used a feedback element employing an iron core, the main winding possessing 20 turns, the first control winding 70 turns and the second control winding 30 turns.

The second control winding of the feedback element can be connected with the control capacitor of the control pulse generator and such can be connected via a charging diode with the primary winding of the charging transformer forming an inductive storage means. To this end, the turns ratio of the charging transformer is chosen such that for the currents flowing through the primary winding the control capacitor is charged-up by the primary winding to a greater voltage than the voltage of the direct-current voltage source provided for the internal combustion engine. This positively ensures for sufficiently intense gating control pulses when the control capacitor is discharged through the second control winding of the feedback element. Generally, it is sufficient if the control capacitor is charged-up to 40 volts by the primary winding of the charging transformer.

In order to always obtain an optimum efficiency, the fuel for an internal combustion engine is delivered by an injection device. The injected fuel quantity must thus be accommodated as accurately as possible to the quantity of air which has been sucked-up, it being necessary to take into account air temperature, air pressure and humidity. These additional influencing parameters must be superimposed upon the control operation of the fuel injection if there should be obtained a really optimum fuel delivery.

The transistor circuit arrangement of the present invention can also be utilized for regulating the injection of fuel by means of an electromagnetically actuated control. To this end, an excitation winding of the electromagnetically actuated control is connected in the discharge current circuit of the storage capacitor containing the ignition thyristor, and the ignition circuit of the control thyristor, apart from the temperature-dependent resistor, contains a resistor which can be adjusted by a pressure measuring device and/or a resistor which can be adjusted by a humidity or moisture measuring device. The temperature-dependent resistor, the pressure-dependent resistor and the moisture-dependent resistor are thus advantageously connected parallel to the control electrode and the cathode of the control thyristor.

BRIEF DESCRIPTION OF THE DRAWING

The invention will be better understood and objects other than those set forth above, will become apparent when consideration is given to the following detailed description of a preferred embodiment of transistor circuit arrangement described for use in both controlling the generation of ignition sparks as well as also for controlling the injection of fuel at an internal combustion engine, and wherein the single FIGURE of the drawing depicts schematically a circuit diagram of this exemplary embodiment of circuitry.

DETAILED DESCRIPTION OF THE PREFERRED EMBODIMENTS

Describing now the drawing, the circuit arrangement illustrated therein will be seen to be composed of three circuit portions, namely, a first circuit portion SA which can be designated as intermediate load, a second circuit portion SB which as the transistor circuit arrangement according to the invention should supply the first circuit portion SA with current pulses of constant intensity, and finally a third circuit portion SC, the control pulse generator, which delivers control pulses to both circuit portions SA and SB.

Continuing, it will be understood that the first circuit portion SA contains a charging transformer 1, the iron core of which carries a primary winding la and a secondary winding 1*b* and which is used as inductive storage means. One terminal or end of the secondary winding 1*b* of the charging transformer 1 is coupled with a ground conductor 9 connected to ground, as shown. The other terminal or end of this secondary winding 1*b* is coupled via a charging diode $D_5$ with the one terminal of a storage capacitor $C_3$. Instead of using a single storage capacitor, it would also be possible to use two parallelly connected capacitors, as such has been shown in the circuit arrangement of the drawing. The junction point between the charging diode $D_5$ and the storage capacitor $C_3$ is connected with two terminal clamps or points *b* and *h*, and also the junction point between the charging diode $D_5$ and the secondary winding 1b is coupled with a terminal clamp or point *c*. The other terminal of the storage capacitor $C_3$ is connected via a diode $D_4$ with the ground conductor 9 and the connection or junction point between the storage capacitor $C_3$ and the diode $D_4$ is coupled with a terminal clamp or point *a*.

Additionally, the first circuit portion SA is equipped with an ignition thyristor 6, the anode $A_6$ of which is connected with a connecting terminal or terminal point *g* and the cathode $K_6$ of which is coupled with the ground conductor 9. The control electrode $G_6$ of the ignition thyristor 6 is electrically connected by means of a conductor 10 with an output terminal 11 of the control pulse generator SC. If the circuit arrangement is used for controlling the generation of ignition sparks, then, the non-grounded end or terminal of the primary winding 7*a* of the ignition transformer 7 is connected with the connection terminal *a* and both connection terminals *g* and *h* are connected with one another, so that the anode $A_6$ of the ignition thyristor 6 is directly connected with the junction point between the charging diode $D_5$ and the storage capacitor $C_3$.

As is conventional, the one terminal or end of the secondary winding 7*b* of the ignition transformer 7 leads to the spark plugs through the agency of the distributor which has not been illustrated in the drawing for purposes of simplification and clarity, and wherein it is further mentioned that only one spark plug has been shown in the drawing, for the same reasons, and in the form of a spark path F. The other terminal of the secondary winding 7*b* is connected to ground. A high ohm rotational speed measuring device 12 can be connected on the one hand to ground and on the other hand to the connection terminal *c'*. The ignition transformer 7 with the terminal *a'*, the short-circuit connection or terminals *g'*, *h'* and the high-ohm rotational speed measuring device 12 with the terminal *c'* have been conveniently assembled together in the drawing as the ignition spark generator I, which, however, can be replaced by an apparatus II if the circuit arrangement SA, SB, SC should be used for regulating the injection of fuel by means of an electromagnetically actuated control or regulator. Purely for purposes of explaining the invention in greater detail, there has been shown in the drawing a control or regulating element 13, wherein a piston member 15 subjected to the action of a helical spring 17 can close a fuel line 14. Piston member 15 carries a rod 16 which can extend into a magnetic coil *7c*, so that upon current flow through the magnetic coil *7c* and the piston member 15 frees the fuel line 14. Both the terminals *g''*, *h''* of the magnetic coil *7c* are then connected to both terminals *g* and *h* of the circuit portion SA, so that the anode $A_6$ of the ignition thyristor 6 is coupled through the agency of the magnetic coil *7c* with the junction point between the storage capacitor $C_3$ and the charging diode $D_5$.

The connection terminal *b* of the circuit portion SA is only used during the control or checking of the circuit arrangement and serves for the connection of suitable checking instruments.

The transistor circuit arrangement SB is equipped with a n-p-n-switching transistor T, the collector of which is connected via the primary winding 1*a* of the charging transformer 1, a connection terminal *d* and the ignition switch Z with the positive pole of the direct-current voltage source B*t*, that is, the vehicle battery. The emitter E of the switching transistor T is coupled by means of the main winding 2*a* of a feedback element 2 and the conductor 9 with the negative pole or terminal of this direct-current voltage source. The feedback element 2 possesses two control windings 2*b*, 2*c*. One terminal of the first control winding 2*b* is coupled with the emitter E of the switching transistor T and by means of a resistor $R_1$ is connected with the base B of such transistor T. The other terminal or end of the first control winding 2*b* is coupled with the base B. The second control winding 2*c* is connected with the third circuit portion SC.

It has been found that the construction of the feedback element is of particular importance if there is to be ensured a faultless operation of the transistor circuit arrangement, and to that end, the turns ratio of the individual windings 2*a*, 2*b*, 2*c* also contribute to a satisfactory operation of the circuit arrangement.

In this connection, it has been found that very good results can be obtained if the turns ratio of the main or primary winding 2*a*, the first control winding 2*b* and the second control winding 2*c* are in a ratio of 1:3.5:1.5. In order to obtain slight dimensions for the feedback element 2 the windings are advantageously arranged upon an iron core 2*d*. To this end, however, the windings and the iron core 2*d* must be so dimensioned that when currents flow through such windings the iron core does not become saturated. A particularly useful construction in this regard was found if the feedback element is designed such that the primary or main winding 2*a* has 20 turns, and, in accordance with the required turns ratio the first control winding 2*b* has 70 turns and the second control winding 2*c* 30 turns, and wherein the cross-sectional area of the iron core amounts to approximately 0.5 $cm^2$.

When the switching transistor T is turned-on then there is provided for the current which is to be conducted to the primary winding 1a of the charging transformer 1 a current path which leads from the positive pole or terminal of the direct-current source B*t* through the ignition switch Z, the primary winding 1*a*, the collector-emitter path of the switching transistor T and the main winding 2*a* of the feedback element 2 and the conductor 9 to the negative terminal or pole of the direct-current source B*t*. The intensity of the current which flows when the ignition switch Z is closed is determined by the conductivity of the collector-emitter path of the switching transistor T since the main winding 2*a* of the feedback element 2 only possesses very slight resistance.

Apart from the resistor $R_1$ there is further connected in parallel with the base-emitter path of the switching transistor T the first control winding 2*b* of the feedback element 2. The base B of the switching transistor T is coupled with the anode of a control thyristor 4, the cathode of such control thyristor 4 being connected to ground, as shown. Furthermore, an ignition circuit ZS is connected in parallel with the control thyristor 4, which in the illustrated embodiment consists of a voltage divider with a work resistor arrangement $R_6$ consisting of two parallelly connected ohmic resistors, serving as the first element and additionally a temperature-dependent resistor 8, preferably a thermistor, serving as the second element. The control electrode $G_4$ of the control thyristor 4 is connected with the center cap of the voltage divider and additionally is coupled via a capacitor $C_4$ with the cathode of the control thyristor 4.

If the circuit arrangement under discussion is used for controlling the generation of ignition sparks, then, an ohmic resistor $R_9$ is connected to the illustrated terminals 18, 19 and therefore connected parallel to the temperature-dependent resistor 8, which has been designated in the drawing by reference character "I" and the block containing the resistor $R_9$, as best observed by referring to the circuit portion SB.

On the other hand, if the circuit arrangement is used for regulating the injection of fuel, then a block or box II is coupled with the terminals 18, 19, this box or block II embodying a pressure-dependent and moisture-dependent resistor 20,21, respectively. A further and more specific explanation of this aspect of the invention will be considered later on in this description.

The resistance values of the ignition circuit ZS for the control thyristor 4 are chosen such that the storage capacitor $C_3$ is charged at −20° C. to 480 volts, at +20° C. to 380 volts, and at +110° C. to 360 volts. When there is used a storage capacitor of approximately 1$\mu$F capacitance and a charging transformer 1, the primary winding 1*a* of which possesses 40 turns and the secondary winding 1*b* of which 500 turns and wherein the cross-sectional area of the iron core amounts to approximately 3.6 $cm^2$, there is connected in parallel with a thermistor of 1.5 kohms at +25° C and ohmic resistor $R_9$ of at most 100 ohms, and as the work resistor or resistor arrangement $R_6$ there are chosen two parallelly connected resistances of 2.2 kohms and 330 ohms, respectively. With such dimensioning of the components of the system, the circuit arrangement is well suited for most passenger vehicles and can be easily optimumly adjusted in each case by slightly varying the resistance values.

The negative terminal or pole of the direct-current voltage source Bt is connected with the movable contact *3b* of the interrupter U and is coupled via a connection terminal *e* with the ground conductor 9 and is connected with ground. The fixed or stationary contact *3a* of such interrupter U is connected with a connection terminal *f* of the control pulse generator, that is to say, with the third circuit portion SC.

This control pulse generator SC is assigned the function of delivering an ignition pulse to the ignition thyristor 6 of the first circuit portion SA each time that the interrupter contacts *3a*, *3b* are opened and a gating control pulse portion SB, in order to up-sense or gate the switching transistor T thereof. Different types of circuitry in known to the art and possible for a pulse generator having such function. It is for that reason that in the drawing the control pulse generator SC has only been shown in a block, and possessing a connection terminal 11 for connecting the control electrode $G_6$ of the ignition thyristor 6 and a connection terminal 13 for connecting the transistor circuit arrangement SB. Furthermore, in the drawing at each such connection terminal 11 and 13 there has been depicted a pulse and the interrupter contacts *3a*, *3b* have been shown in open position n order to indicate that the control pulse generator SC delivers control pulses when these interrupter contacts are open.

Now, for the purpose of generating the gating control pulse for the switching transistor T, in the exemplary embodiment of inventive circuitry the control pulse generator SC is equipped with a control capacitor $C_1$. One terminal of such control capacitor $C_1$ is connected with ground and its other terminal is connected via a charging diode $D_1$ with the primary winding 1a of the charging transformer 1. The feedback element or feedback arrangement 2 of the transistor circuit arrangement SB is equipped with a second control winding *2c*, one terminal of which is connected with the junction point of the control capacitor $C_1$ and the charging diode $D_1$ and the other terminal of which leads to the control pulse generator SC. The control capacitor $C_1$, as will be more fully described hereinafter, should be charged by the charging transformer 1 through the primary winding 1*a* and, when the interrupter contacts 3*a*, 3*b* are open, should discharge through the second secondary winding 2*c*, in order to induce via such second secondary winding a gating control pulse for the switching transistor T at the feedback element 2 and simultaneously to produce an ignition pulse for the ignition thyristor 6 at a resistor $R_7$. This resistor $R_7$ is connected between the control electrode $G_6$ of the ignition thyristor 6 and ground, as shown. To this end, the control pulse generator SC, for instance, can be equipped with an appropriately constructed electronic switch SC', which for instance, contains switching transistors and is connected via a current limiting resistor $R_5$ and the ignition switch Z with the positive pole of the direct-current voltage source Bt, so that upon closing of the ignition switch Z, it becomes switched-in. Furthermore, this electronic switch SC' is controlled by the interrupter U in such a manner that when the interrupter contacts 3*a*, and 3*b* are open it is brought into a switching state where the control capacitor $C_1$ can discharge, and when the interrupter contacts 3*a*, 3*b* close such can then become deenergized.

It is here assumed that the control capacitor $C_1$ has been charged. Now, if with the interrupter contacts 3*a*, 3*b* opened the ignition switch Z is closed, then, the electronic switch SC' is in its excited switching state and by virtue of discharging of the control capacitor $C_1$ there is delivered, as mentioned above, at the connection terminal 11 an ignition pulse which ignites the ignition thyristor 6 through the agency of the conductor 10. The storage capacitor $C_3$ discharges and, for instance, in the secondary winding 7*b* of the ignition transformer 7 there is induced a high voltage leading to an ignition spark.

At the same time, due to the discharge current flowing through the second control winding 2*c* of the feedback element 2, there is induced in its first control winding 2*b* a voltage which in the form of a short positive control pulse tends to somewhat up-sense or gate the switching transistor T, so that also current begins to flow through the main winding 2*a*. Due to the initially weak current flow in the main winding 2*a* the base-emitter current of the switching transistor T is increased owing to the feedback via the first control winding 2*b*. The current through the primary winding 1*a*, the collector-emitter path of the switching transistor T and the main winding 2*a* increases. This feedback causes the switching transistor T to become fully switched or turned-on in the shortest period of time and an intense or pronounced current flows through the primary winding 1*a*.

If the current flowing through the series circuit consisting of the primary winding 1*a*, the collector-emitter path and the main winding 2*a* has increased to such a value that the voltage drop at the control path of the switching transistor T, that is to say, between the base and the main winding 2*a* is sufficient in order to ignite the control thyristor 4 through the agency of the ignition circuit ZS constructed as a voltage divider, then the voltage appearing between the base of the switching transistor T and ground is reduced and the switching transistor T is forced to assume its non-conductive state owing to the decreasing base current. With decreasing current through the main winding 2*a* the polarity of the voltage induced in the first-control winding 2*b* reverses, the base becomes more negative with respect to the emitter and the switching transistor T completely becomes blocked in a short period of time.

The maximum current intensity of a work pulse brought about by switching in and blocking of the switching transistor T at the load, that is in the primary winding 1a of the charging transformer 1, is determined by the resistance values of the ignition circuit ZS, in other words, the resistances $R_6$, $R_9$ and the thermistor defined by the temperature-dependent resistor 8. The momentary ignition of the control thyristor 4 is influenced by the thermistor. Furthermore, it is here mentioned that is easily possible to select a thermistor possessing such a temperature coefficient that the changes of the maximum current intensity brought about by the temperature fluctuations can be compensated through corresponding changes during ignition of the control thyristor 4. In order to more easily accommodate the thermistor there is provided the resistor $R_9$ connected in parallel therewith.

Upon blocking of the switching transistor T, the magnetic field of the charging transformer 1 collapses and voltages are induced in the primary and secondary windings thereof. The relationship of the turns ratio of the primary and secondary windings is chosen such that the control capacitor $C_1$ charges via the charging diode $D_1$ to about 40 volts and the storage capacitor $C_3$ to about 370 volts. A storage capacitor $C_3$ and a control capacitor $C_1$ each possessing about $1 \mu F$ capacitance is then sufficient in order to make available sufficient energy for the generation of pronounced ignition sparks and control pulses. Additionally, the control capacitor $C_1$ as the auxiliary voltage source possesses a higher voltage than the direct-current voltage source Bt, so that it can advantageously be utilized for de-energizing the electronic switch SC' upon closing the interrupter contacts 3*a*, 3*b* since through a higher voltage difficulties with contacts can be prevented.

The charging of the storage capacitor $C_3$ and the control capacitor $C_1$ begins practically immediately after the ignition spark discharge, and upon closing the interrupter contacts 3*a*, 3b the circuit arrangement is ready for the subsequent working operation.

If the transistor circuit arrangement is used for controlling or regulating the injection of fuel, then, the electromagentically actuatable control or regulating element 13 is connected to the terminal *g,h* and instead of the block I or in addition to this block there is connected the block II at the terminals 18, 19 of the ignition circuit of the control thyristor 4. Upon ignition of the ignition thyristor 6, the storage capacitor $C_3$ discharges through the winding 7*c* of the electromagnetically actuated control or regulating element 13, and depending upon the energy which has been stored in the storage capacitor the throughflow of fuel through the fuel 14 is more or less freed. In order to render the fuel delivery dependent upon the pressure of the air and the moisture content or humidity thereof, the ignition circuit SC for the control thyristor 4, as already explained, is provided apart from the temperature-dependent resistor 8, also with the pressure-dependent and moisture-dependent resistors 20 and 21, respectively.

Suitable as the pressure-dependent resistor there can be advantageously used, for instance, a strain gauge or an elastic resistor which is mechanically coupled with a pressure measuring device, for instance, a pressure measuring nozzle. As far as the moisture-dependent resistor there can be used a similar arrangement which, instead of being equipped with a pressure measuring device, has a moisture-sensitive element.

The three circuit components SA, SB and SC are advantageously housed in a hermetically sealed housing G, which has been schematically represented in the drawing by the phantom-lines and wherein the connection terminals *a* . . . *h* serve the purpose of connecting the circuit arrangement beneath the hood of the vehicle to the corresponding components. The circuit arrangement is simple in construction and as will be apparent, without undergoing considerable modification, it can be used, depending upon requirements, for instance for controlling the generation of ignition sparks or for regulating or controlling the injection of fuel. Accordingly, this equipment can be economically and inexpensively manufactured, so that a vehicle can be equipped with such equipment without appreciably increasing the cost thereof, so that then it is possible to ensure for a combustion process which is optimumly controlled in every regard.

The transistor circuit arrangement can also be used for supplying some other type of load with work pulses, whereby, the slight variations in the circuitry can be undertaken and are possible without any great difficulty in order to better accommodate such circuit to the momentarily encountered requirements. Thus, for instance, in very simple situations the feedback element or arrangement can be replaced by only a main winding and a first control winding, and instead of using a thermistor there can be employed, for instance, also a diode.

While there is shown and described present preferred embodiments of the invention, it is to be distinctly understood that the invention is not limited thereto but may be otherwise variously embodied and practiced within the scope of the following claims. ACCORDINGLY.

What is claimed is:

1. A transistor circuit for providing output pulses having a constant current magnitude, said transistor circuit comprising, in combination: a load; a switching transistor, said switching transistor containing a collector-emitter circuit and a base circuit; a feedback element having a main winding and a control winding, said control winding connected to said base circuit of said switching transistor; a d-c voltage source, said d-c voltage source, said load, said collector-emitter circuit and said main winding being connected in series; a control pulse generator for gating said switching transistor during each working pulse, said control pulse generator being connected to said control winding of said feedback element; a control thyristor for blocking said switching transistor when the current flow in said series circuit reaches a given current magnitude, said control thyristor being connected to said base circuit of said switching transistor; an ignition circuit for firing said control thyristor, and including a temperature-dependent resistor, said temperature-dependent resistor connected to the control electrode of said control thyristor; whereby said control thyristor is turned on when the collector current of said switching transistor exceeds a magnitude determined by the resistance value of said ignition circuit and whereby said switching transistor is completely blocked by said feedback element.

2. The circuit arrangement as defined in claim 1, wherein ohmic resistors are connected in said ignition circuit of said control thyristor, at least one of said resistors being adjustable to different resistance values.

3. The circuit arrangement as defined in claim 2, wherein said resistors of said ignition circuit of said control thyristor are connected between its anode and control electrodes.

4. The circuit arrangement as defined in claim 2, wherein said resistors of said ignition circuit of said control thyristor are connected between its cathode and control electrodes.

5. The circuit arrangement as defined in claim 2, wherein said ignition circuit of said control thyristor incorporates at least one ohmic work resistor for adjusting the current intensity of the work pulses.

6. The circuit arrangement as defined in claim 2, wherein said adjustable resistor constitutes part of a measuring value transmitter means for an additional influencing parameter in order to regulate the momentary current intensity of the work pulses as a function of such additional influencing parameter.

7. The circuit arrangement as defined in claim 6, wherein said ignition circuit of said control thyristor incorporates at least one ohmic work resistor for adjusting the current magnitude of work pulses, said temperature-dependent resistor and each adjustable resistor influenced by said measuring value transmitter being connected in parallel to the control electrode and the cathode of said control thyristor, and said control electrode being coupled with the anode of said control thyristor by means of said work resistor.

8. The circuit arrangement as defined in claim 7, wherein said temperature-dependent resistor (8) comprises a thermistor.

9. The circuit arrangement as defined in claim 1, further including a control pulse generator containing a control capacitor, said control winding means of said feedback element including a first control winding defining said control winding coupled with said transistor base and a second control winding, said second control winding being galvanically separated from said first control winding for generating the gating control pulses for said switching transistor, said second control winding being connected with said control capacitor in order to induce a gating control pulse for said switching transistor in said first control winding of said feedback element during each discharge of said control capacitor through said second control winding, which discharge is controlled by said control pulse generator.

10. The circuit arrangement as defined in claim 9, wherein said windings of said feedback element are arranged upon an iron core, said feedback element being dimensioned such that its iron core is not saturated during the maximum intensity of the current flowing through its main winding.

11. The circuit arrangement as defined in claim 5, further including a control pulse generator containing a control capacitor, said control winding means of said feedback element including a first control winding defining said control winding coupled with said transistor base and a second control winding, said second control winding being galvanically separated from said first control winding for generating the gating control pulses for said switching transistor, said second control winding being connected with said control capacitor in order to induce a gating control pulse for said switching transistor in said first control winding of said feedback element during each discharge of said control capacitor through said second control winding which discharge is controlled by said control pulse generator, and wherein for controlling the combustion of fuel in an internal combustion engine with the ignition controlled by a control transmitter said load is provided with a storage capacitor and a charging transformer, the storage capacitor during a first position of said control transmitter being charged via a charging rectifier through the secondary winding of said charging transformer and in a second position of said control transmitter being discharged by means of an ignition thyristor through a terminal load element, and wherein the collector-emitter path of said switching transistor is connected by means of a primary winding of said charging transformer with one pole of said direct-current voltage source and through the main winding of said feedback element with the other pole of said direct-current voltage source, and wherein said feedback element and said ignition thyristor are connected to said control pulse generator controlled by said control transmitter in order to always then deliver a gating control pulse for said switching transistor and an ignition pulse for said ignition thyristor when said control transmitter is in a second position.

12. The circuit arrangement as defined in claim 11, serving for the controlled generation of ignition sparks by means of capacitor discharges, wherein said terminal load element comprises an ignition transformer having a primary winding connected with said storage capacitor, said feedback element possessing said main winding, first control winding and second control winding having a turns ratio of said main winding, first control winding and second control winding in the relationship of 1:3.5:1.5 respectively.

13. The circuit arrangement as defined in claim 12, wherein said windings of said feedback element are arranged upon an iron core, said feedback element being dimensioned such that its iron core is not saturated during the maximum intensity of the current flowing through its main winding, said main winding of said feedback element possessing 20 turns said first control winding 70 turns and said second control winding 30 turns.

14. The circuit arrangement as defined in claim 12, wherein said second control winding of said feedback element is connected with the control capacitor of the control pulse generator, said control pulse generator being connected via a charging diode with the primary winding of the charging transformer forming an inductive storage means, and said control capacitor being charged by means of said primary winding to a higher voltage than the voltage of said direct-current voltage source associated with the internal combustion engine, and being discharged by said second control winding of said feedback element when the control transmitter assumes its second position.

15. The circuit arrangement as defined in claim 14, wherein said control capacitor is charged to 40 volts through said primary winding of said charging transformer.

16. The circuit arrangement as defined in claim 12, wherein said ohmic work resistor and said temperature-dependent resistor of said ignition circuit for the control thyristor possess resistance values which by means of a regulation of the current flowing through the primary winding of the charging transformer ensure for charging of the storage capacitor to 480 volts at −20°, to 380 volts at +20° C, and to 360 volts at +110° C.

17. The circuit arrangement as defined in claim 16, wherein said temperature-dependent resistor comprises a thermistor having a resistance value of 1.5 kohms at +20° C, and said thermistor having connected in parallel thereto an ohmic resistor of maximum 100 ohms.

18. The circuit arrangement as defined in claim 2, wherein said adjustable resistor which can be regulated to different resistance values constitutes part of a measuring value transmitter means for an additional influencing parameter in order to regulate the momentary current intensity of the work pulses as a function of such additional influencing parameter, and wherein for controlling the injection of fuel in an internal combustion engine there is provided an electromagnetically actuated regulator means having an excitation winding, said excitation winding of said electromagnetically actuated regulator means being connected in a discharge current circuit of a storage capacitor containing an ignition thyristor, and said ignition circuit of said control thyristor, apart from containing said temperature-dependent resistor, contains a resistor which can be adjusted by a measuring device of said measuring transmitter means.

19. The circuit arrangement as defined in claim 18, wherein said measuring device for adjusting said resistor comprises a pressure measuring device.

20. The circuit arrangement as defined in claim 18, wherein said measuring device comprises a moisture-measuring device for adjusting said resistor.

21. The circuit arrangement as defined in claim 18, wherein said measuring device comprises a pressure measuring device for said adjustable resistor, and there being additionally provided a further adjustable resistor and a moisture measuring device for adjusting said further adjustable resistor.

22. The circuit arrangement as defined in claim 21, wherein said ignition circuit of said control thyristor incorporates at least one ohmic work resistor for adjusting the current intensity of the work pulses, said control electrode of said control thyristor being coupled with the anode of said control thyristor by means of said work resistor, said temperature-dependent resistor, said pressure-dependent resistor and said moisture-dependent resistor being connected in parallel to the control electrode and the cathode of said control thyristor.

* * * * *